Sept. 11, 1956     E. J. MOSELEY     2,762,634
ANTI-JACKKNIFING DEVICE FOR TRACTOR-TRAILERS
Filed Sept. 16, 1952     2 Sheets-Sheet 1

Earl J. Moseley
INVENTOR.

BY *Clarence A. O'Brien*
*and Harvey B. Jacobson*
Attorneys

Sept. 11, 1956     E. J. MOSELEY     2,762,634
ANTI-JACKKNIFING DEVICE FOR TRACTOR-TRAILERS
Filed Sept. 16, 1952     2 Sheets-Sheet 2
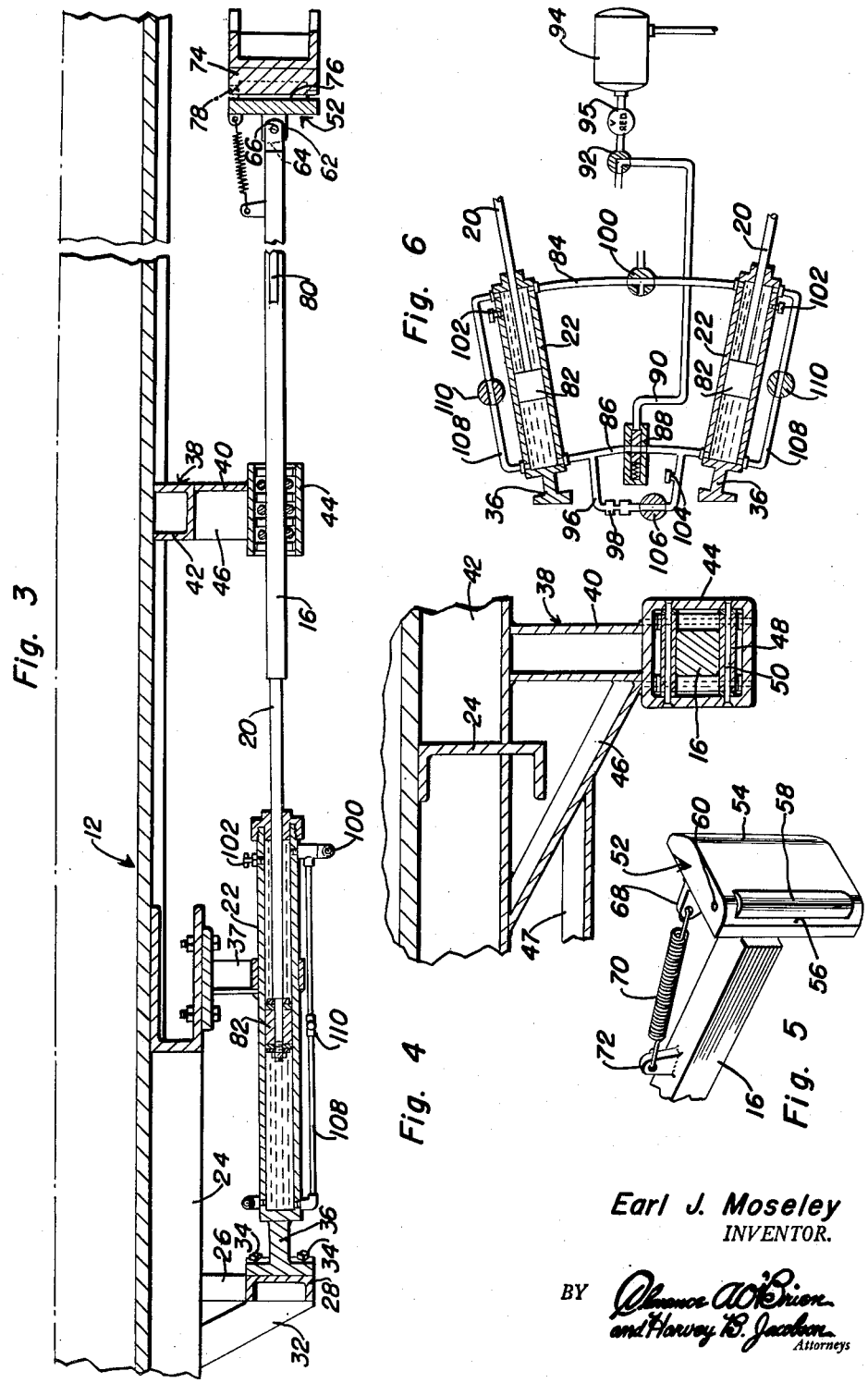
Earl J. Moseley
INVENTOR.

United States Patent Office 2,762,634
Patented Sept. 11, 1956

2,762,634

ANTI-JACKKNIFING DEVICE FOR TRACTOR-TRAILERS

Earl J. Moseley, Front Royal, Va., assignor of one-third to Dudley P. Powers and one-third to Earl S. Houghton, Front Royal, Va.

Application September 16, 1952, Serial No. 309,751

8 Claims. (Cl. 280—432)

This invention relates in general to devices for controlling the swing of a trailer vehicle, and more particularly to a device for preventing jackknifing of tractor-trailers.

A primary object of this invention is to provide an improved device adapted to be mounted on trailers and engaged with portions of a tractor whereby the swinging of the trailer with respect to the tractor may be controlled from the tractor.

Another object of this invention is to provide a plurality of shiftable arms carried by a trailer and engaging with a buffer bar carried by an associated tractor, said shiftable arms resisting swinging of the trailer with respect to the tractor, the shifting of the shiftable arms being controlled by hydraulic cylinders associated therewith.

Another object of this invention is to provide an improved anti-jackknifing device for tractor-trailers which is of a relatively simple construction and may be conveniently secured to tractors and trailers now on the road.

A further object of this invention is to provide an improved anti-jackknifing device for tractor-trailers which is mounted on a trailer and engages a buffer bar carried by the tractor to limit the swinging of the trailer with respect to the associated tractor, said anti-jackknifing device being normally disengaged and controllable from the tractor, said anti-jackknifing device being completely disengageable whereby the tractor may be easily and quickly connected to the trailer in the conventional manner.

An additional object of invention is to provide in a tractor-trailer combination coupled together by means of a "fifth-wheel," a novel "anti-jackknifing" system utilizing mutually cooperating mechanical force transmitting means and hydraulic damping means.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 3 is an enlarged fragmentary longitudinal vertical sectional view taken substantially upon the plane indicated by the section line 3—3 of Figure 2 and shows the specific construction of one of the shiftable arms and the supporting means therefor, a central portion of the shiftable arm and trailer being omitted;

Figure 4 is an enlarged fragmentary transverse vertical sectional view taken substantially on the plane indicated by the section line 4—4 of Figure 1 and shows the construction of a hanger for supporting the intermediate and forward portion of one of the shiftable arms;

Figure 5 is an enlarged perspective view of the forward end of one of the shiftable arms and shows the general construction of a buffer bar engageable shoe mounted thereon; and Figure 6 is a piping diagram of the control means for the shiftable arms.

Similar characters of reference designate similar or identical elements and portions throughout the specification and throughout the different views of the drawings.

Figure 1:
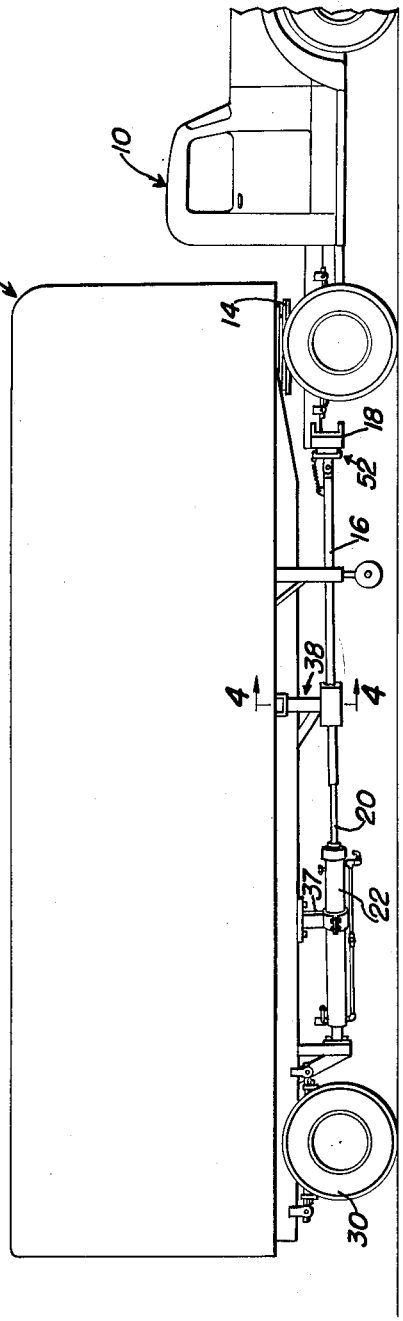
Figure 1 is a side elevational view of a tractor drawn trailer, the trailer and tractor having mounted thereon the anti-jackknifing device which is the subject of this invention, the front portion of the tractor being omitted.
Figure 2:
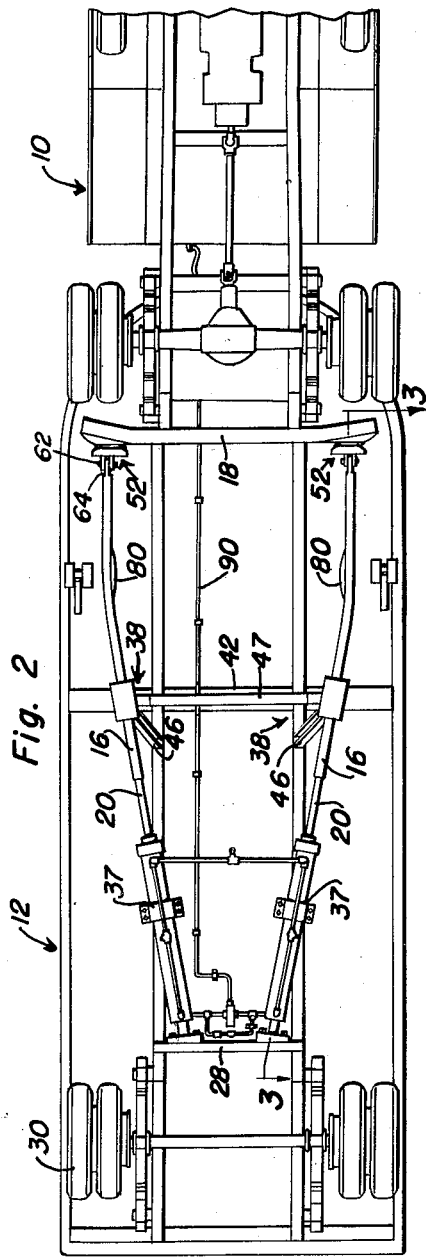
Figure 2 is a bottom plan view of the tractor and trailer of Figure 1 and shows the general arrangement of the anti-jackknifing device carried thereby.

Referring now to the drawings in detail, it will be seen that there is illustrated in Figures 1 and 2 a conventional tractor 10 which has connected thereto a conventional trailer 12. The trailer 12 is connected to the tractor 10 by a fifth wheel 14 and is drawn thereby. It will be seen that normally the tractor 10 and the trailer 12 are connected only by the fifth wheel 14 which forms a pivot connection and thereby permits no control of the swinging of the rear end of the trailer 12 from the operator of the tractor 10 other than the pull exerted thereon by the tractor 10 to prevent the rear end of a trailer 12 from catching up to the tractor.

Referring now to Figure 2 in particular, it will be seen that carried by the trailer 12 beneath the bottom thereof is a pair of shiftable arms 16 which extend a major portion of the length of the trailer 12 and are in engagement at their forward ends with a transversely extending buffer bar 18 carried by the rear of the tractor 10. The rear ends of the shiftable arms 16 are connected to forwardly extending piston rods 20 of hydraulic cylinders 22 mounted at the rear of the shiftable arms 16, the hydraulic cylinders 22 restraining the shiftable arms 16 against movement whereby the swinging of the trailer 12 with respect to the tractor 10 is also restrained.

Referring now to Figure 3 in particular, it will be seen that secured to the underside of the frame 24 of the trailer 12 are transversely aligned spaced downwardly extending supports 26 to which is connected a transversely extending hanger 28. The hanger 28 is positioned forwardly of the rear wheels 30 of the trailer 12 and is braced by a pair of downwardly and forwardly extending braces 32 carried by the frame 24. Extending rearwardly from each of the hydraulic cylinders 22 and connected to the hanger 28 by fasteners 34 is a mounting base 36. Also depending from the frame 24 is a pair of loose fitting weight carrying hangers 37 supporting front portions of the hydraulic cylinders 22.

Referring now to Figures 3 and 4 in particular, it will be seen that the shiftable arms 16 have their intermediate and forward portions supported by hanger constructions, which are referred to in general by the reference numeral 38. Each of the hanger constructions 38 include a vertical support 40 secured to the underside of a transverse frame member 42 of the trailer 12 and connected at its forward end to a generally longitudinally extending sleeve or bearing carrier 44. The lower end of the support 40 is braced by a downwardly and outwardly sloping brace 46 also secured to the underside of the transverse frame member 42 and the braces are interconnected by a transverse tie brace 47. Mounted within each bearing carrier 44 is a plurality of bearing blocks having rollers 48 mounted for rotation on pins 50, the rollers 48 providing bearings for an intermediate portion of one of the shiftable arms 16. Mounted at the forward end of each of the shiftable arms 16 is a shoe 52 for engaging the buffer bar 18 carried by the tractor 10. The shoe 52 is generally rectangular and has beveled forwardly extending edges 54 and 56 for facilitating the turning of the shiftable arms 16 with respect to the buffer bar 18. In order that the shoe 52 may slide with respect to the buffer bar 18, the beveled vertical edge 56 is provided with a vertically extending roller 58 mounted on a vertically extending pin 60, the roller 58 being partially recessed within the shoe 52.

In order that the shoe 52 may be aligned with the buffer bar 18, it is provided with a bifurcated rear portion 62 receiving a flattened forward end 64 of the associated shiftable arm 16. The bifurcated rear portion 62 is secured to the flattened forward end 64 by a horizontally extending pivot pin 66 whereby limited pivoting of the shoe 52 about a horizontal axis is permitted. In order that the shoe 52 be retained in an upright position, it has projecting from the upper rear portion thereof a lug 68 to which is connected a tension spring 70, the rear end of the tension spring 70 being connected to a lug 72 projecting outwardly from the upper side of the shiftable arm 16. It will be understood that the shoe 52 is aligned by engagement thereof with its associated portion of the buffer bar 18.

Referring now to Figures 2 and 3 in particular, it will be seen that the end portions of buffer bar 18 are angled slightly forward and that the same are provided with built-up shoe engaging portions 74. The shoe engaging portions 74 are provided with vertically extending rollers 76 partially countersunk therein and being rotatably mounted on vertically extending pivot pins 78, the rollers 76 engaging the shoes 52 to facilitate sliding movement thereof. Inasmuch as the shiftable arms 16 slope slightly upwardly as best illustrated in Figure 1, the shoe engaging surfaces of the shoe engaging portions 74 tilt slightly downwardly and forwardly to be at substantially right angles to the longitudinal axis of the forward portions of the shiftable arms 16. It will be also noted that the shiftable arms 16 are generally angular in that the rear portions thereof extend forwardly and outwardly from the hanger 28 and the forward portions of the shiftable arms 16 extend parallel to the longitudinal axis of the trailer 12. The bend in each of the shiftable arms 16 is reenforced by a base 80 welded to the inner side of the bend.

Referring now to Figure 6 in particular, it will be seen that mounted within each of the hydraulic cylinders 22 and connected to the rear end of the associated piston rod 20 is a piston 82. It will be noted that the hydraulic cylinders 22 are filled with fluid on both sides of their respective pistons 82 whereby movement of the shiftable arms 16 connected to their associated piston rods 20 results in a pressure being exerted on a portion of the fluid therein. In order that the shiftable arms 16 may be moved longitudinally of the trailer 12 to permit turning of the same with respect to the tractor 10, the hydraulic cylinders 22 are connected at their forward ends by a communicating line 84 which is tapped into the undersides thereof. The communicating line 84 permits hydraulic fluid to be pumped from the forward end of one of the hydraulic cylinders 22 into the forward end of the other hydraulic cylinders 22. In order that hydraulic fluid may also be pumped from the rear end of one of the hydraulic cylinders 22 into the rear end of the other hydraulic cylinder 22, the two are connected together by a communicating line 86 extending between the rear ends of the hydraulic cylinders 22 and tapped into the upper portions thereof, thus the cylinders 22 are connected in series by means of the conduits 84 and 86.

It will be understood that during normal operation of the tractor 10 and trailer 12, hydraulic fluid is free to pass through the communicating line 84, but passage of hydraulic fluid through the communicating line 86 would be prevented by a normally closed valve 88. The rear ends of the cylinders are communicated by a restricted by-pass line, to be described in more detail hereinafter, to permit slow turning of the tractor and trailer. The valve 88 is connected to a pressure line 90 which is connected by a valve 92 to an air pressure tank 94 carried by the tractor 10. The pressure line 90 is provided with a conventional self closing valve (not shown) to permit disengaging of the tractor from the trailer. Positioned between the valve 92 and the air pressure tank 94 is an air reducing valve 95. When it is desired to make a quick turn with the tractor and trailer, the valve 92 is turned by the operator of the tractor 10 to an open position with the result that the normally closed valve 88 moves to an open position due to air pressure from the air supply tank 94.

In order that the shifting of the shiftable arms 16 may only be restrained instead of being completely locked, the communicating line 86 is provided with a by-pass line 96 which by-passes the valve 88. The by-pass line 96 is provided with a restricter 98 which limits the flow of hydraulic fluid between the hydraulic cylinders 22 and thereby restrains the trailer 12 against jackknifing, but at the same time permits a slow turning thereof with respect to the tractor 10.

In order that the hydraulic cylinders 22 may be conveniently filled with hydraulic fluid, the communicating line 84 is provided with a three-way cock 100 through which the hydraulic cylinders 22 may be either filled or drained either one at a time or both together.

Inasmuch as the hydraulic cylinder 22 will not function in the desired manner if they contain air, which is compressible, the by-pass line 96 is provided with an air vent 104 for venting all air from the rear end of the hydraulic cylinders 22. The hydraulic cylinders also have air vents 102 in the upper sides thereof for further bleeding air therefrom. The by-pass line 96 is also provided with a shut-off cock 106 which may be utilized in combination with the valve 88 to completely prevent flow of hydraulic fluid through the communicating line 86 between the hydraulic cylinders 22. By shutting off the shut-off cock 106, shut-off cock 110, the pistons 82 and their respective shiftable arms 16 may be retained in any desired position.

In order that the shiftable arms 16 may be moved to a rearmost position during the attaching of the trailer 12 to the tractor 10 to permit freedom of movement of the tractor 10 relative to the trailer 12 when coupling the tractor and trailer, each of the hydraulic cylinders 22 is provided with a communicating line 108 which communicates the forward end of the respective hydraulic cylinder 22 with the rearward end thereof. The communicating lines 108 are provided with shut-off cocks 110 which are normally closed so that the hydraulic cylinders 22 may function in a desired manner. However, when the shut-off cocks 110 are opened the fluid within each of the hydraulic cylinders may flow from one end to the other whereby the pistons 82 may be positioned at the rear ends thereof. After the trailer 12 has been attached to the tractor 10, the shoes 52 of the shiftable arms 16 are moved into engagement with the buffer bar 18 and the shut-off cocks 110 closed. In view of the foregoing, it will be seen that the swinging of the trailer 12 with respect to the tractor 10 may be restricted by an operator of the tractor 10 through the use of the anti-jackknifing device secured to the trailer and in engagement with the buffer bar 18.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. An anti-jackknifing device for use on tractor-trailers connected by a pivotal connection permitting lateral pivotal movement of the trailer relative to the tractor, including longitudinally disposed shiftable compression arms mounted on a trailer for reciprocating relative thereto, a transversely disposed compressive force transmitting member mounted on said tractor engageable with each of said arms and operative to transmit compressive force due to sudden pivotal movement of said trailer relative to said tractor, hydraulic cylinders containing cooperating pistons therein operatively connected with said compressive arms and coaxial therewith, operable to dampen shifting movement of said arms due to the compressive force exerted by the transverse member, a plurality of fluid conduit means interconnecting the hydraulic cylinders in series, and fluid restricting means provided in the fluid conduit means between said cylinders to diminish fluid flow therebetween tending to dampen sudden shifting of said compression arms.

2. In an anti-jackknifing device as set forth in claim 1 where additional fluid conduit means are connected in parallel with said fluid restricting means, and a manually operator controllable fluid valve is operatively associated with said additional fluid conduit means for by-passing said fluid restricting means and permitting free flow of fluid between said hydraulic cylinders.

3. In an anti-jackknifing device as set forth in claim 1 wherein each of said shiftable compression arms include on an end remote from the hydraulic cylinders self-aligning shoe members including thereon anti-friction means on the bearing surfaces thereof for contacting said transverse compressive force transmitting member and operative to facilitate relative movement between the contacting parts thereof.

4. An anti-jackknifing device for use on tractor-trailers having a pivotal connection therebetween which permits lateral pivotal movement of the trailer relative to the tractor comprising longitudinally disposed shiftable compression arms on a trailer for reciprocating relative thereto, a transversely extending compressive force transmitting member mounted on the rear of said associated tractor and engageable by said arms, hydraulic cylinders containing piston members having fluid on both sides thereof and operatively connected with said shiftable compression arms for dampening shifting of the same whereby sudden uncontrolled pivotal movement of a trailer with respect to a tractor is restrained, fluid conduit means connecting said hydraulic cylinders in series, fluid restricting means contained in said fluid conduit means between said cylinders to diminish fluid flow whereby fluid contained in said hydraulic cylinders is operable to be transferred by movement of said shiftable arms due to compressive force exerted by the transversely extending force transmitting member.

5. In an anti-jackknifing device as set forth in claim 4 wherein operator controlled valve means are operatively associated with additional fluid conduit means and the fluid conduit means between the hydraulic cylinders whereby actuation of said operator valve means permits by-passing of fluid past said fluid restricting means to permit unrestricted pivotal movement between the trailer and tractor.

6. An anti-jackknifing device for use with a tractor-trailer vehicle comprising longitudinally disposed compression shiftable arms mounted on a first part of a tractor-trailer vehicle for reciprocating relative thereto, a transversely extending force transmitting member engageable with said arms and mounted on the second part of a tractor-trailer vehicle, said arms having one end engageable in spaced relationship with said force transmitting member, fluid cylinders containing fluid pistons operatively connected to the other end of said arms operable to control shifting of said arms whereby pivotal movement of a trailer relative to a tractor may be restrained, fluid conduit means connecting said hydraulic cylinders in series whereby fluid may be transferred by movement of said arms and pistons to position said arms relative to said transverse force transmitting member, and fluid restricting means in said fluid conduit means for restricting the flow of fluid between said cylinders to thereby dampen sudden shifting movement of said compressive arms.

7. An anti-jackknifing system for use in a tractor-trailer system utilizing a "fifth-wheel" pivotal connection between the tractor and trailer comprising a transverse force transmitting member carried by said tractor, longitudinally disposed shiftable compressive force transmitting elements carried by said trailer and engageable at one end with the force transmitting member, fluid motors including fluid pistons therein operatively associated at the other end of the compressive force transmitting elements, fluid conduit means connecting said fluid motors in series wherein movement of said fluid pistons in said fluid motors in conjunction with movement of said shiftable compressive force transmitting elements causes the passage of fluid between said fluid motors, and fluid restricting means in said fluid conduit means tending to impede fluid passage between said fluid motors and shifting movement of said shiftable force transmitting members, whereby relative lateral pivotal movement between said trailer and tractor is impeded.

8. In an anti-jackknifing device as set forth in claim 7 wherein additional fluid conduit means are operatively associated in the fluid conduit means between the fluid motors by means of an operated control valve whereby the fluid restricting means in the first mentioned fluid conduit means may be by-passed to permit relatively free movement of the fluid motor pistons, shiftable elements, and lateral pivotal movement between the trailer and tractor.

References Cited in the file of this patent

UNITED STATES PATENTS

| | | |
|---|---|---|
| 287,084 | Balderston | Oct. 23, 1883 |
| 2,194,160 | Brewster | Mar. 19, 1940 |
| 2,330,897 | Kirksey | Oct. 5, 1943 |
| 2,470,383 | Wakeman | May 17, 1949 |

FOREIGN PATENTS

| | | |
|---|---|---|
| 602,487 | Great Britain | May 27, 1948 |
| 602,486 | Great Britain | May 27, 1948 |